Sept. 6, 1938.  A. BERNHARD ET AL  2,129,114
MULTIRANGE PHOTOELECTRIC EXPOSURE METER
Filed Feb. 27, 1936  2 Sheets-Sheet 1
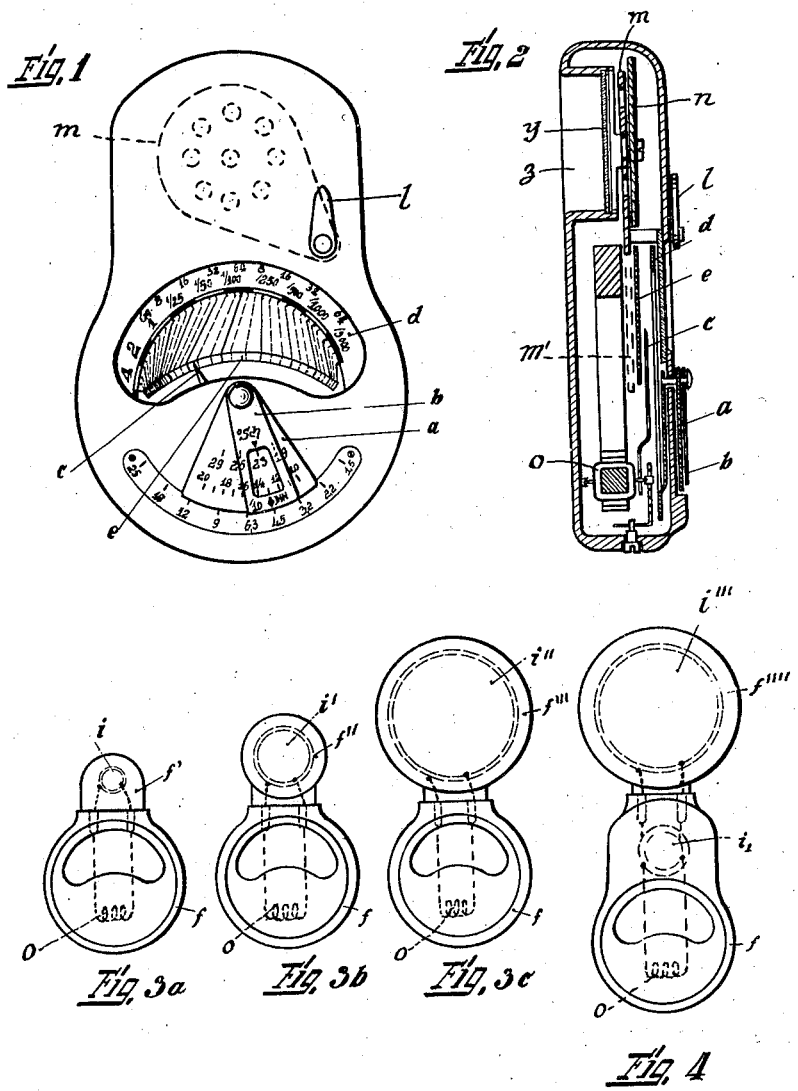
INVENTORS:
ALBRECHT BERNHARD
GUIDO BEYRICH

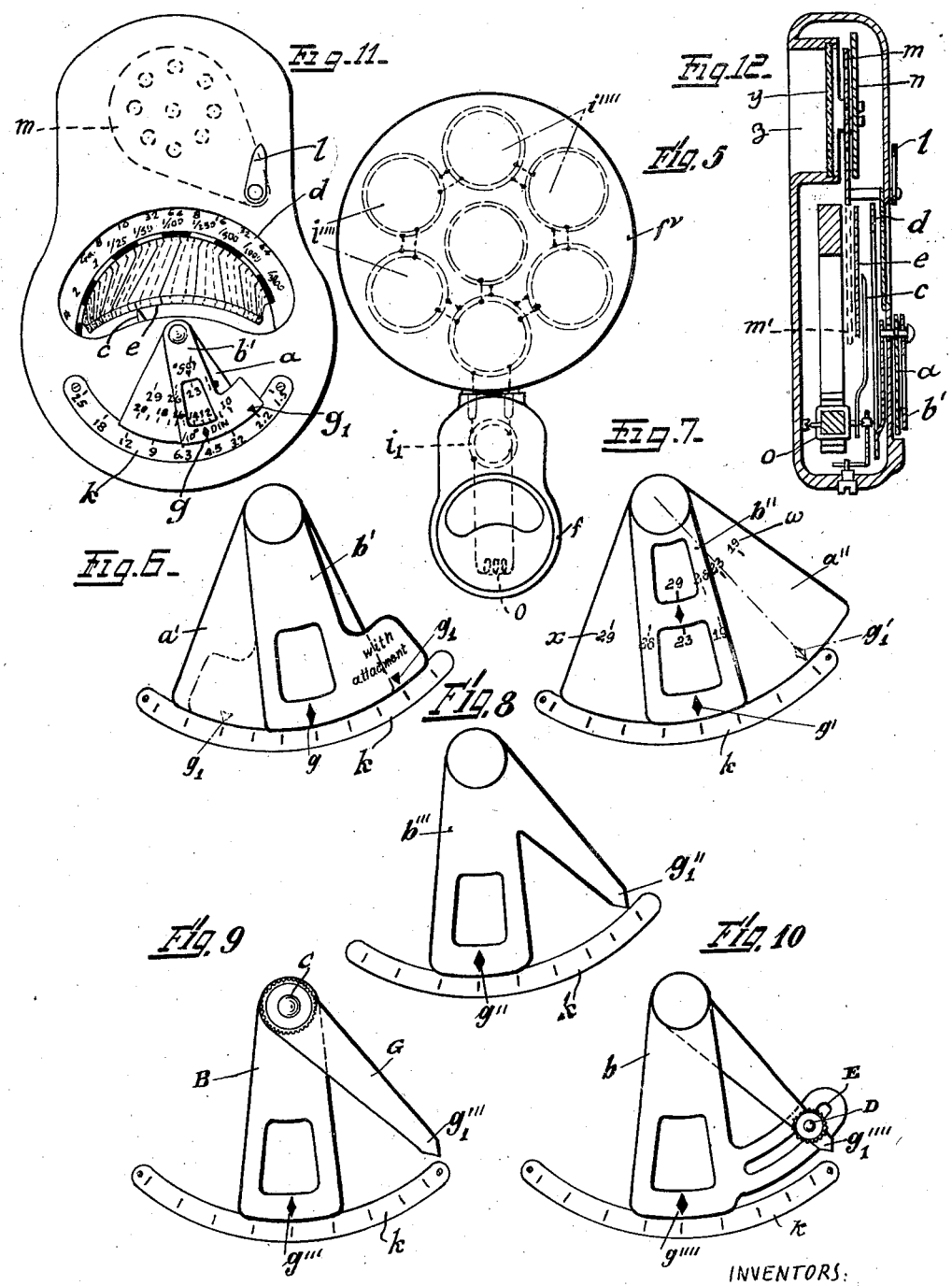

Patented Sept. 6, 1938

2,129,114

UNITED STATES PATENT OFFICE 2,129,114

MULTIRANGE PHOTOELECTRIC EXPOSURE METER

Albrecht Bernhard and Guido Beyrich, Nuremberg, Germany, assignors to Metrawatt Aktiengesellschaft Fabrik Elektrischer Messgeraete, Nuremberg, Germany, a company of Germany Application February 27, 1936, Serial No. 66,092 In Germany March 2, 1935

9 Claims. (Cl. 88—23)

The present invention relates to photo-electric exposure meters for photographic purposes, and more particularly to photo-electric exposure meters described in U. S. Patent #2,092,826, dated September 14, 1937.

In known instruments of this type, a light sensitive photo-electric element is combined with an electric current meter or other electric indicating device in a common casing. The measuring range has hitherto been altered by inserting resistances in the electric circuit or by using an adjustable diaphragm in connection with the photo-electric cell. In these cases, however, the alteration of the measuring range can only be effected easily in an integral ratio, usually in the ratio 1:10.

It is an object of this invention to enable the measuring range of photo-electric exposure meters, and more particularly of meters such as described in the above-mentioned patent, in my desired ratio to be altered without introducing any substantial difficulty for the user.

It is another object of the invention to enable the measuring range to be altered within extremely wide limits.

It is still another object of the invention to adapt such instruments easily to any desired measuring range.

Further objects of the invention will be apparent from the description as it proceeds.

In order that our invention may be more clearly understood, some embodiments thereof are described hereinafter with reference to the accompanying drawings, in which Figs. 1 and 2 are a front view and a cross-sectional view respectively of a known photo-electric exposure meter having a single photo-electric element arranged within the casing;

Figs. 3a, 3b and 3c illustrate diagrammatically an exposure meter according to our invention with detachable photo-electric elements of different sizes.

Fig. 4 shows another embodiment of our invention, illustrating an exposure meter embodying a photo-electric element and having an additional photo-electric attachment.

Fig. 5 illustrates an exposure meter similar to that shown in Fig. 4 with an attachment comprising a plurality of photo-electric elements.

Figs. 6 to 10 illustrate respectively five embodiments of indicating means for adapting the exposure meter to different stop values and film speeds.

Figs. 11 and 12 are a front view and a cross-sectional view respectively of an exposure meter according to the invention embodying a movable diaphragm.

Referring first to Figs. 1 and 2, a rotatable uniform scale $d$ for reading off exposure times or the speed of a film is provided, which is adjustable by an external handle $a$ and which is arranged above a fixed non-uniform scale $e$ of the electric indicating device. Both scales $d$ and $e$ are connected to each other by auxiliary connecting lines whereby the non-uniform divisions or areas of the first scale are converted into uniform divisions or areas of the second scale and the non-uniform deflections of the pointer $c$ are adapted to be read off from the uniform scale $d$. On the handle $a$, a pointer $b$ is provided adapted to be set in accordance with the sensitivity of the emulsion and comprising an index mark co-operating with a scale $k$ of stop values and adapted to be set in accordance with a given stop value. All this is more fully described in Patent No. 2,092,826 mentioned above.

As already known per se, a diaphragm $m$ having holes is provided which can be brought into the position $m'$ by means of a lever $l$. In this position, light passing through a channel $z$ and a transparent covering plate $y$ arrives with its full intensity on the surface of a photo-electric element $n$, whereas, when the diaphragm assumes the position $m$, only that part of the light which passes through the holes in the diaphragm reaches the photo-electric element. Thereby, the intensity of the light is reduced in a given ratio and thus the measuring range is altered.

The electric indicating device is provided with electrical connecting means, whereby different photo-electric elements or cells of different effective size or sensitivity can be plugged in or otherwise connected to an electro-magnetic coil $o$ of the electric indicating device and the measuring range thus altered.

In Fig. 3a, $f$ is the casing containing the electric indicating device and which is provided with sockets, into which can be plugged an attachment $f'$ which contains the photo-electric element $i$. Obviously other forms of connection may be employed. For instance, the plugs and sockets may be interchanged or a screw connection may be employed.

Fig. 3b shows a device similar to that shown in Fig. 3a but with an attachment $f''$ and the photo-electric element $i'$ which are larger than the attachment $f'$ and the photo-electric element $i$ illustrated in Fig. 3a. The attachment $f'''$ and the photo-electric element $i''$ indicated in Fig.

3c are still larger than the attachment f'' and i'' of Fig. 3b. The different sizes of the photo-electric elements i, i', i'' correspond to different sensitivities, and provide different measuring ranges. Alternatively, as shown in Fig. 5, the attachment $f^V$ may comprise a plurality of elements i'''', the number of which is different for different attachments corresponding to different measuring ranges. Furthermore, as shown in Figs. 4 and 5, the instrument f may comprise a built-in element $i_1$, with which the element i''' (Fig. 4) or elements i'''' (Fig. 5) of an external attachment f'''' or $f^V$ respectively can be connected, preferably in parallel so as to alter the measuring range. With the constructions just described, the measuring range can be altered within extremely wide limits by using photo-electric elements of suitable size or sensitivity. When using large elements, a very high limiting sensitivity can be obtained and the instrument can be used in bad lighting conditions (e. g. for interior exposures). Nevertheless, in the favourable lighting conditions, which usually exist, a small handy instrument can be employed, so that the use of the instrument on journeys and in sport exposures is not inconvenient.

If the effective sensitivities of the different photo-electric elements are in an integral ratio, it is possible to use only one reading-off scale on the instrument and to calculate the exposure times by multiplying the indicated figures by an appropriate factor.

If, however, the ratio between the sensitivities of the elements is not integral, multiple scales would have to be employed, which are undesirable in view of space restrictions and owing to the difficulty in reading off. The invention makes it possible for any desired ratio between the effective element surfaces or sensitivities to use a single scale for reading off the exposure times or film speeds. To this end, the changes in the sensitivities of the photo-electric elements is taken into account by a relative displacement between the handle a, serving for adjusting the scale d, and the scale of stop values, which displacement corresponds to the logarithm of the change in the measuring range. If, for instance, the photo-electric element i' (Fig. 3b) furnishes a current which is 4.2 times as great as that of the photo-electric element i (Fig. 3a) for which the instrument has been calibrated, the relative displacement between the index mark for the scale d and the scale of stop values must correspond to the value log 4.2.

The relative displacement between the index mark g (see Fig. 6) and the scale k of stop values can be effected in various ways. If only two measuring ranges have to be provided, the handle a' or the pointer b' rotatably arranged thereon may be provided with two index marks g and $g_1$, which move in front of the scale k of stop values, and the distance between which corresponds to the logarithm of the ratio between the sensitivities of the elements used for the two measuring ranges.

In the embodiment illustrated in Fig. 7, the sector shaped handle a'' is provided with two different scales x and w of emulsion sensitivities which are displaced relatively to one another to such an extent that when the pointer b'' is moved from one sensitivity mark on one scale (for example 23° Sch) to the corresponding mark on the other scale, the index mark g' moves to the position $g_1'$ through a distance which is equal to the distance between the marks g and g' shown in Fig. 6. The index marks g and g' respectively (Figs. 6 and 7) move to the right when the measuring range is increased and to the left when the measuring range is decreased. Alternatively, the stop values may be provided on a scale which is displaceable by the distance indicated above and is used in different positions for the two measuring ranges.

Fig. 8 shows a form of pointer b''' in the shape of a sector in which the marks g'' and $g_1''$ are very clearly distinguished so that confusion between them is avoided.

Fig. 9 shows an embodiment in which the two marks g''' and $g_1'''$ are adjustable relatively to one another, in order that the distance between the marks may be accurately matched to the sensitivity of the photo-electric element which is employed in the second measuring range. After adjustment has been effected, the arm G may be rigidly clamped to the other part of the sector B by means of a set screw C or the like.

Fig. 10 shows a similar construction in which the alteration of the distance between the index marks g'''' and $g_1''''$ is effected by means of a set screw D guided in a slot E.

It will be understood that more than two index marks corresponding to more than two measuring ranges may be employed.

It will easily be appreciated that the above described embodiments, in which two (or more) marks or scales, displaced relatively to one another by certain distances, are provided for the different measuring ranges, are also applicable with equal advantage to exposure meters where the measuring range is altered by altering the active surface of the photo-electric element incorporated in the casing of the exposure meter by means of a diaphragm or the like instead of interchanging the photo-electric elements. In this case also, the distance between the two marks or scales must correspond to the logarithm of the ratio between the element sensitivities which apply to the different measuring ranges.

Such an arrangement comprising a diaphragm, is diagrammatically illustrated in Figs. 11 and 12 which show the meter of Figs. 1 and 2 provided with the device shown in Fig. 6. In Figs. 11 and 12 m is a diaphragm provided with holes. l is a lever by means of which the diaphragm m can be brought into the position m'. In this position, light passing through a channel z and a transparent covering plate y arrives with its full intensity on the surface of a photo-electric element n, whereas, when the diaphragm assumes the position m, only that part of the light which passes through the holes in the diaphragm reaches the photo-electric element. Thereby, the intensity of the light is reduced in a given ratio and thus the measuring range is altered. The pointer b' as already described with reference to Fig. 6 is provided with two index marks g and $g_1$ which move in front of the scale k of stop values, and the distance between which corresponds to the logarithm of the ratio between the sensitivities of the light corresponding to the two positions of the diaphragm m.

We claim:—

1. Photo-electric exposure meter, comprising at least one photo-electric element, an electric current meter electrically connected to said photo-electric element, a scale provided on said meter, a pointer actuated by said meter and cooperating with said scale, means for varying the photo-electric current supplied to said meter to alter the range of measurement, a movable second scale co-operating with said first scale, a scale of stop values, means for positioning said movable scale in accordance with a given stop value, and indicating means provided on said positioning means, co-operating with said scale of stop values, and comprising a plurality of indicating marks corresponding to different ranges of measurement, the distance between two indicating marks being determined by the logarithm of the ratio of the photo-electric currents in the corresponding ranges of measurement.

2. Photo-electric exposure meter, comprising at least one photo-electric element, an electric current meter electrically connected to said photo-electric element, a scale provided on said meter, a pointer actuated by said meter and co-operating with said scale, means for varying the photo-electric current supplied to said meter to alter the range of measurement, a movable second scale co-operating with said first scale, a scale of stop values, a scale of emulsion sensitivities, means for positioning said movable scale in accordance with a given stop value and a given emulsion sensitivity, indicating means provided on said positioning means and co-operating with said scale of stop values, a handle provided on said indicating means, said scale of emulsion sensitivities being provided on said handle, and a pointer rotatably arranged on said handle, said pointer comprising a plurality of indicating marks corresponding to different ranges of measurement.

3. Photo-electric exposure meter, comprising at least one photo-electric element, an electric current meter electrically connected to said photo-electric element, a scale provided on said meter, a pointer actuated by said meter and co-operating with said scale, means for varying the photo-electric current supplied to said meter to alter the range of measurement, a movable second scale co-operating with said first scale, a scale of stop values, two scales of emulsion sensitivities, means for positioning said movable scale in accordance with a given stop value and a given emulsion sensitivity, indicating means provided on said positioning means and co-operating with said scale of stop values, and a handle provided on said indicating means, said two scales of emulsion sensitivities being provided on said handle and corresponding to different ranges of measurement, corresponding values of said two scales of emulsion sensitivities being displaced by a distance which is determined by the logarithm of the ratio of the photo-electric currents in the corresponding ranges of measurement.

4. In combination, an electric current meter, means for detachably connecting different photo-electric elements of different power to said meter to alter the range of measurement, a scale provided on said meter, a pointer actuated by said meter and co-operating with said scale, a movable second scale co-operating with said first scale, a scale of stop values, means for positioning said movable scale in accordance with a given stop value, and indicating means provided on said positioning means, co-operating with said scale of stop values, and comprising a plurality of indicating marks corresponding to different ranges of measurement, the distance between two indicating marks being determined by the logarithm of the ratio of the photo-electric currents in the corresponding ranges of measurement.

5. In combination, an electric current meter, means for detachably connecting different photo-electric elements of different power to said meter, a scale provided on said meter, a pointer actuated by said meter and co-operating with said scale, a movable second scale co-operating with said first scale, a scale of stop values, a scale of emulsion sensitivities, means for positioning said movable scale in accordance with a given stop value and a given emulsion sensitivity, indicating means provided on said positioning means and co-operating with said scale of stop values, a handle provided on said indicating means, said scale of emulsion sensitivities being provided on said handle, and a pointer rotatably arranged on said handle, said pointer comprising a plurality of indicating marks corresponding to different ranges of measurement, the distance between two indicating marks being determined by the logarithm of the ratio of the photo-electric currents in the corresponding ranges of measurement.

6. Photo-electric exposure meter, comprising at least one photo-electric element, an electric current meter electrically connected to said photo-electric element, a scale provided on said meter, a pointer actuated by said meter and co-operating with said scale, means for detachably connecting at least one further photo-electric element for altering the range of measurement, a movable second scale co-operating with said first scale, a scale of stop values, means for positioning said movable scale in accordance with a given stop value, and indicating means provided on said positioning means, co-operating with said scale of stop values and comprising a plurality of indicating marks corresponding to different ranges of measurement, the distances between two indicating marks being determined by the logarithm of the ratio of the photo-electric currents in the corresponding ranges of measurement.

7. Photo-electric exposure meter, comprising at least one photo-electric element, an electric current meter electrically connected to said photo-electric element, a scale provided on said meter, a pointer actuated by said meter and co-operating with said scale, means for detachably connecting at least one further photo-electric element for altering the range of measurement, a movable second scale co-operating with said first scale, a scale of stop values, a scale of emulsion sensitivities, means for positioning said movable scale in accordance with a given stop value and a given emulsion sensitivity, indicating means provided on said positioning means and co-operating with said scale of stop values, a handle provided in said arrangement, said scale of emulsion sensitivities being provided on said handle, and a pointer rotatably arranged on said handle, said pointer comprising a plurality of indicating marks corresponding to different ranges of measurement.

8. Photo-electric exposure meter, comprising at least one photo-electric element, an electric current meter electrically connected to said photo-electric element, a scale provided on said meter, a pointer actuated by said meter and co-operating with said scale, a diaphragm incorporated in the meter and adapted to alter the range of measurement by altering the active surface of said photo-electric element, a movable second scale co-operating with said first scale, a scale of stop values, means for positioning said movable scale in accordance with a given stop value, and indicating means provided on said positioning means, co-operating with said scale of stop values, and comprising a plurality of indicating marks corresponding to different ranges of measurement, the distance between two indicating marks being determined by the logarithm of the ratio of the photo-electric currents in the corresponding ranges of measurement.

9. Photo-electric exposure meter, comprising at least one photo-electric element, an electric current meter electrically connected to said photo-electric element, a scale provided on said meter, a pointer actuated by said meter and co-operating with said scale, a diaphragm incorporated in the meter and adapted to alter the range of measurement by altering the active surface of said photo-electric element, a movable second scale co-operating with said first scale, a scale of stop values, a scale of emulsion sensitivities, means for positioning said movable scale in accordance with a given stop value and a given emulsion sensitivity, indicating means provided on said positioning means and co-operating with said scale of stop values, a handle provided on said indicating means, said scale of emulsion sensitivities being provided on said handle, and a pointer rotatably arranged on said handle, said pointer comprising a plurality of indicating marks corresponding to different ranges of measurement, the distance between two indicating marks being determined by the logarithm of the ratio of the photo-electric currents in the corresponding ranges of measurement.

ALBRECHT BERNHARD.
GUIDO BEYRICH.